United States Patent
Lu et al.

(10) Patent No.: US 11,966,960 B2
(45) Date of Patent: Apr. 23, 2024

(54) METHOD, SYSTEM, AND COMPUTER PROGRAM PRODUCT FOR VIRTUAL REALITY BASED COMMERCE EXPERIENCE ENHANCEMENT

(71) Applicant: International Business Machines Corporation, Armonk, NY (US)

(72) Inventors: Fang Lu, Billerica, MA (US); Martin G. Keen, Cary, NC (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/452,578

(22) Filed: Oct. 28, 2021

(65) Prior Publication Data

US 2023/0133891 A1     May 4, 2023

(51) Int. Cl.
G06Q 30/00     (2023.01)
G06Q 30/0282     (2023.01)
G06Q 30/0601     (2023.01)
G06T 19/00     (2011.01)
G06T 19/20     (2011.01)

(52) U.S. Cl.
CPC ..... G06Q 30/0631 (2013.01); G06Q 30/0282 (2013.01); G06Q 30/0643 (2013.01); G06T 19/003 (2013.01); G06T 19/20 (2013.01)

(58) Field of Classification Search
CPC .................................................. G06Q 30/0643
See application file for complete search history.

(56) References Cited

U.S. PATENT DOCUMENTS

| | | | |
|---|---|---|---|
| 7,364,070 B2 | 4/2008 | Chang | |
| 7,729,951 B2 | 6/2010 | Dawson | |
| 9,836,747 B2 | 12/2017 | Borrero | |
| 10,019,747 B2 | 7/2018 | Hu | |
| 10,438,262 B1 * | 10/2019 | Helmer | G06Q 30/0643 |

(Continued)

FOREIGN PATENT DOCUMENTS

KR     20090018822 A     2/2009

OTHER PUBLICATIONS

Zheng, Ling, A Study on Evaluation Model of VR Shopping Experience based on User-Centered Approach, Dec. 1, 2020, 2020 International Conference on Innovation Design and Digital Technology (ICIDDT), pp. 323-333 (Year: 2020).*

Ahn et al., "Supporting Healthy Grocery Shopping Via Mobile Augmented Reality", AMC Trans. Multi. Comput. Commu. Appl., vol. 12, No. 1s, Article 16, pp. 1-24, Oct. 21, 2015.

(Continued)

*Primary Examiner* — Allison G Wood
*Assistant Examiner* — Timothy J Kang
(74) *Attorney, Agent, or Firm* — James L. Olsen (57) ABSTRACT

Aspects of the present disclosure relate to virtual reality (VR) based commerce experience enhancement. A set of user data associated with a user can be received. A session of a VR commerce environment can be initiated with the user. A set of products to include in the VR commerce environment can be selected based on the set of user data. A position and orientation of each of the products of the set of products within the VR commerce environment can be determined based on the set of user data. The set of products can be displayed within the VR commerce environment according to the determined position and orientation of each product of the set of products.

17 Claims, 6 Drawing Sheets

(56) References Cited

U.S. PATENT DOCUMENTS

| | | | |
|---|---|---|---|
| 10,861,085 B1 | 12/2020 | Magee | |
| 10,904,117 B1* | 1/2021 | Wong | H04L 43/08 |
| 11,068,969 B2 | 7/2021 | Wilson | |
| 11,087,381 B2 | 8/2021 | Hirsch | |
| 2005/0080683 A1 | 4/2005 | Jordan | |
| 2010/0205043 A1* | 8/2010 | Edwards | G06Q 30/0201 |
| | | | 715/848 |
| 2013/0066740 A1* | 3/2013 | Ouimet | G06Q 30/02 |
| | | | 705/26.7 |
| 2013/0317950 A1 | 11/2013 | Abraham | |
| 2014/0344102 A1 | 11/2014 | Cooper | |
| 2015/0371254 A1 | 12/2015 | Pugh | |
| 2018/0137561 A1 | 5/2018 | Glazer | |
| 2019/0066198 A1 | 2/2019 | Keeler | |
| 2019/0251622 A1* | 8/2019 | Wiedmeyer | G06Q 30/0643 |
| 2020/0209949 A1* | 7/2020 | Noris | G06Q 30/0241 |
| 2020/0273092 A1* | 8/2020 | Wilson | G06T 19/003 |
| 2021/0201286 A1 | 7/2021 | Panigrahi | |

OTHER PUBLICATIONS

Alshaal et al.; "Enhancing Virtual Reality Systems With Smart Wearable Devices", IEEE 17th International Conference on Mobile Data Management (MDM), pp. 1-4, Jun. 13-16, 2018.

Mell et al., "The NIST Definition of Cloud Computing", NIST, National Institute of Standards and Technology, Special Publication 800-145, Sep. 2011, 7 pages.

Pfeiffer et al., "Eye-Tracking-Based Classification of Information Search Behavior Using Machine Learning: Evidence from Experiments in Physical Shops and Virtual Reality Shopping Environments", Information Systems Research, vol. 31, No. 3, pp. 675-691, Sep. 2020.

Speicher et al. "VRShop: A Mobile Interactive Virtual Reality Shopping Environment Combining the Benefits of On- and Offline Shopping", Proceedings of the ACM on Interactive, Mobile, Wearable and Ubiquitous Technologies, vol. 1, No. 3, Article 102. Publication date: Sep. 2017, 31 pages.

Wolfel et al., "Immersive Shopping Presentation of Goods In Virtual Reality", CERC 5th Conference on, Mar. 2019, pp. 119-130.

* cited by examiner

METHOD, SYSTEM, AND COMPUTER PROGRAM PRODUCT FOR VIRTUAL REALITY BASED COMMERCE EXPERIENCE ENHANCEMENT

BACKGROUND

The present disclosure relates generally to the field of virtual reality (VR), and in particular, to VR-based commerce experience enhancement.

Virtual Reality (VR) systems simulate virtual environments using computer technology. VR systems provide sensory data (e.g., audio and visual data) to users such that the users experience an immersive environment. VR systems typically include a wearable display (e.g., a head-mounted display (HMD) or glasses) used to visualize a simulated environment. The simulated environment can be similar to the real world or entirely fictional.

SUMMARY

Embodiments of the present disclosure are directed to a method, system, and computer program product for virtual reality (VR) based commerce experience enhancement. A set of user data for a user can be received. A session of a VR commerce environment can be initiated with the user. A set of products to include in the VR commerce environment can be selected based on the set of user data. A position and orientation of each of the products of the set of products within the VR commerce environment can be determined based on the set of user data. The set of products can be displayed within the VR commerce environment according to the determined position and orientation of each product of the set of products.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of virtual reality (VR), and in particular, to VR-based commerce experience enhancement. While the present disclosure is not necessarily limited to such applications, various aspects of the disclosure can be appreciated through a discussion of various examples using this context.

Within a commerce environment, retailers and wholesalers place their products on the shelves in a particular manner. They may be arranged in horizontal or vertical patterns such that product viewing by customers is enhanced. Product facing may also be completed to refresh shelves and orient products towards customers to increase sales of products. As commerce environments occupy physical space, brands will typically pay to have their products placed in particular locations and oriented in particular directions. However, the placement and orientation of products in physical spaces is typically completed for a general audience, independent of preferences of individual customers. As such, many customers may have difficulty finding the products they desire, which can lead to a decrease in overall sales for a commerce enterprise.

Aspects of the present disclosure relate to virtual reality (VR) based commerce experience enhancement. A set of user data for a user can be received. A session of a VR commerce environment can be initiated with the user. A set of products to include in the VR commerce environment can be selected based on the set of user data. A position and orientation of each of the products of the set of products within the VR commerce environment can be determined based on the set of user data. The set of products can be displayed within the VR commerce environment according to the determined position and orientation of each product of the set of products.

There are various advantages to personalizing a VR commerce environment based on user data associated with a user involved in VR shopping. As opposed to VR shopping which is non-personalized and built for a general audience, computing resources can be preserved. For example, rendering of products which are deemed to not be of interest to a user can be avoided, thus preserving processing resources (e.g., GPU utilization) and memory resources (e.g., video random access memory (VRAM)), which may already be intensive given the nature of VR graphics rendering. Further still, sales of products can be increased by commerce enterprises, as users may be more likely to engage with (e.g., purchase, save for later, etc.) products they may not have otherwise identified. Further still, usability of VR commerce systems is enhanced as users may not be required to search through as many products, move through a VR environment as often, and/or spend time identifying products they may be interested in within a VR commerce environment.

Figure 1:
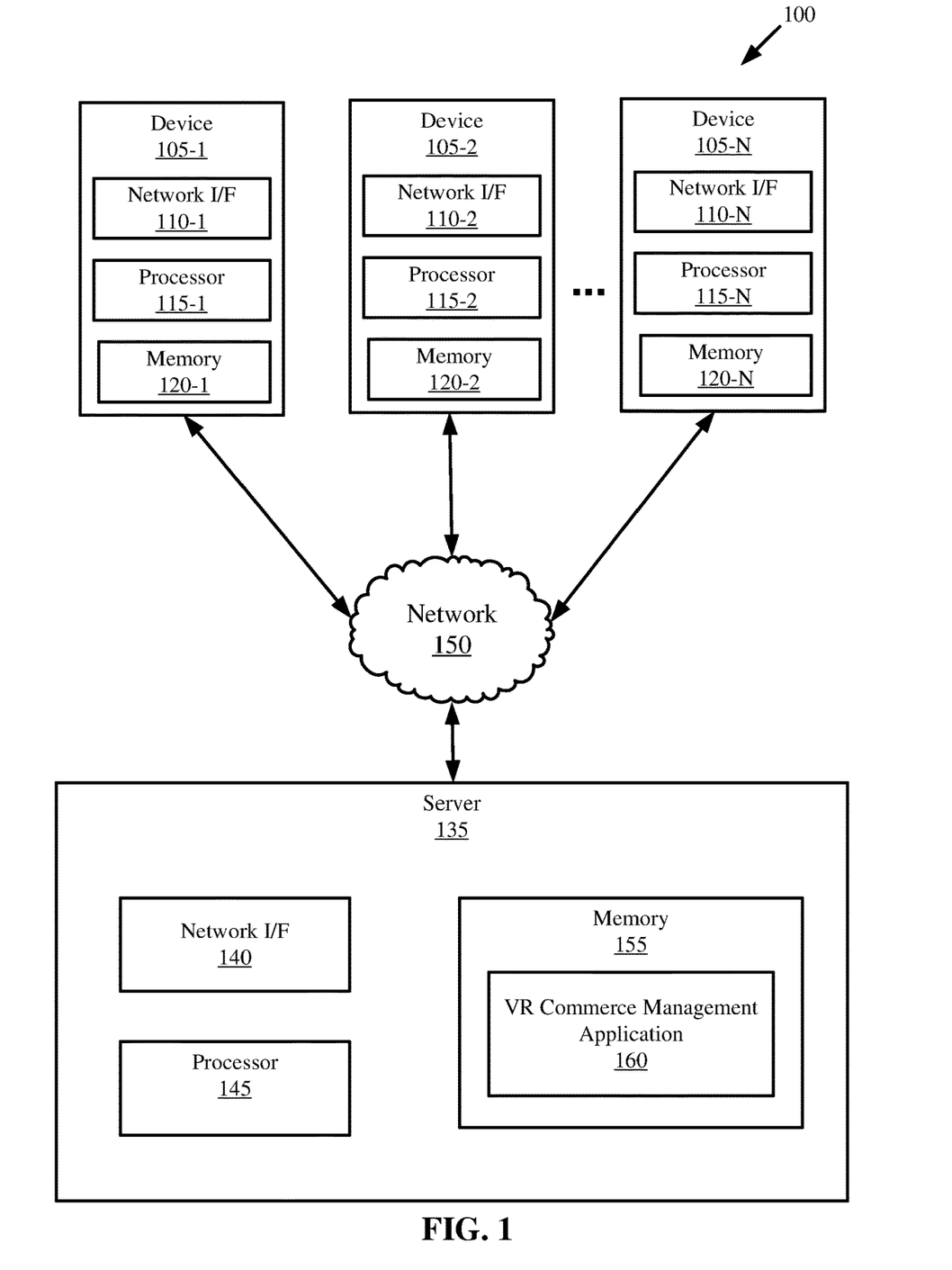
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., virtual reality software, browser software, communications software, server software, natural language processing software, search engine and/or web crawling software, image processing software, etc.). The devices 105 and/or the server 135 can be servers, desktops, laptops, financial transaction terminals, or handheld devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes a virtual reality (VR) commerce management application 160. The VR commerce management application 160 can be configured to generate a virtual environment in which users can shop for products that are selected, positioned, and oriented based on user data (e.g., contextual and/or historical user data).

The VR commerce management application 160 can first be configured to receive user data (e.g., contextual data, historical data, learning data, etc.). The user data can be used/considered by the VR commerce management application 160 to select, position, and orient products within a generated VR environment for a particular user. The user data can be collected, received, or otherwise obtained from any suitable source. In embodiments, the user data can include previous VR shopping data. The previous VR shopping data can include indications of time spent shopping, time viewing particular products (e.g., eye-tracking data), interactions with products (e.g., product reviews, purchases, etc.), queries conducted on products (e.g., searches for products or voice commands used to identify/search for products), mobility within a VR space (e.g., the sections/types of products a user browses, such as particular aisles or sections in a virtual environment), and/or feedback received from the user regarding their previous VR shopping experiences.

In embodiments, user data can include contextual data associated with the user. For example, the contextual data can include availability data (e.g., how much time a user has available based on calendar data), biometric data (e.g., the user's current heart rate, glucose level, etc.), and sentiment data (e.g., sentiment determined based on captured sensor data by internet of things (IoT) sensors, such as cameras and/or microphones). The current contextual data associated with the user can aid in decision making for product selection, placement, and orientation within a rendered VR shopping space by VR commerce management application 160.

To initiate a VR session, the user may first perform a set-up procedure which may be completed on a user device (e.g., user device 105-1) and/or the server 135. For example, the VR user can install required VR software on a computer system (e.g., device 105-1 and/or server 135) and configure communicative coupling between the computer system, a VR head-mounted display (HMD) (e.g., device 105-2), and any applicable tracking sensors (e.g., optical tracking sensors, accelerometers, etc.) used to track the user during VR gameplay. Upon initiation of the VR software on the computer system, the VR user can be prompted for a room set-up. The room set-up can ensure that the VR HMD is properly calibrated based on the VR user (e.g., a proper height and viewing direction), and that the VR user does not collide with nearby objects. The room set-up can include indicating the location of the ground, the height of the user, and the direction the user will be oriented during VR use. Further, the room set-up can include defining a VR boundary. The VR boundary can be defined to ensure that the VR user will not collide with stationary objects in the room. This is completed by displaying the VR boundary to the VR user while using the VR HMD such that the user remains within the VR boundary and does not collide with nearby objects. In embodiments, the VR boundary may only be displayed while the user is moving (e.g., to minimize clutter when immersed in the VR environment).

Upon initializing the VR software and room set-up, the user can select (e.g., via a graphical user interface (GUI) within VR) an option to begin a VR commerce experience. Thereafter, the VR commerce management application 160 can be configured to determine a selection of products (e.g., a set of products) to include in the VR commerce experience, a position of each product within the VR commerce experience, and an orientation of each product within the VR commerce experience based on the user data. The VR commerce management system 160 can consider various factors within the user data, and may weight individual factors, to determine specific product selections, placements, and orientations, to be discussed further below.

In embodiments, the VR commerce management system 160 can dynamically update the VR environment by adding and/or removing one or more products from the VR commerce environment, changing the placement of products within the VR commerce environment, and/or changing the orientation of products within the VR commerce environment based on the VR user's current context within the VR commerce environment (e.g., mobility patterns, eye-tracking patterns, recognized voice, received user input, etc.). This can be completed to refresh (e.g., introduce) new products within the VR commerce environment that the VR user may be interested in, remove products that the user may not be interested in, and/or rearrange existing products in instances where the user has not identified or interacted with the products within the VR commerce environment.

In embodiments, machine learning (ML) and artificial intelligence (AI) techniques can be used by the VR commerce management application 160 to determine and/or modify selection of products, placement of products, and/or orientation of products (e.g., modify rules for determining which products to select, where to position products, and which direction to orient products) within the VR commerce environment. ML and AI algorithms that can be used to aid in product selections, placements, and orientations within the VR commerce environment include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to the VR commerce management system 160 (e.g., current contextual user data, current VR shopping data, historical user data, previous VR shopping data, etc.) can be analyzed or utilized as training data using any of the aforementioned machine learning algorithms.

More specifically, the ML and AI algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other ML and AI techniques.

Though this disclosure pertains to the collection of personal data (e.g., historical user data and current contextual user data), it is noted that in embodiments, users opt-in to the system (e.g., the VR commerce management system 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
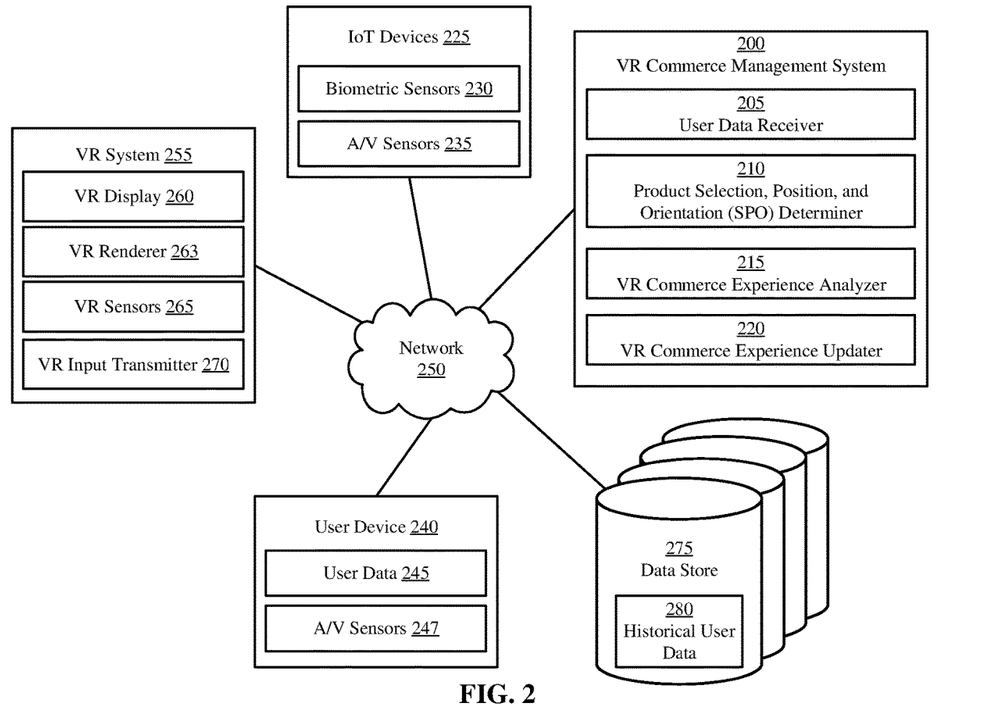
FIG. 2 is a block diagram illustrating an IoT environment, in accordance with embodiments of the present disclosure.

Referring now to FIG. 2, illustrated is a block diagram of an example Internet of Things (IoT) environment according to aspects of the present disclosure. The IoT environment can include numerous components communicatively coupled by a network 250, such as, but not limited to, a VR commerce management system 200, IoT devices 225, a user device 240, a VR system 255, and a datastore 275. The various components within the IoT environment can be processor executable instructions that can be executed by a dedicated or shared processor using received inputs.

The VR system 255 can be configured to display a virtual environment in which users can shop for products. The VR system 255 includes a VR display 260, a VR renderer 263, VR sensors 265, and a VR input transmitter 270. The VR display 260 can be a VR head-mounted display with a screen used to display a virtual environment. In embodiments, the VR display 260 can be a smart phone adapted to be worn by a user to display a virtual environment. However, any suitable VR display 260 can be implemented. The VR display 260 can have any suitable display features (e.g., resolution, lighting characteristics, and field of view (FOV) can vary).

The VR renderer 263 can be configured to render the virtual environment for display on the VR display 260. For example, VR renderer 263 can include a computer system with a central processing unit (CPU) and/or graphical processing unit (GPU) suitable for rendering a virtual environment. In embodiments, the VR renderer 263 can be integrated with the VR display 260.

The VR sensors 265 can include one or more sensors configured to track a user's movement within a virtual boundary. This can be completed such that the user's position within the virtual environment can be updated in-real time while immersed in VR. In embodiments, one or more VR sensors 265 can be integrated with VR display 260, VR renderer 263, and/or VR input transmitter 270. Examples of sensors that can be used to aid in facilitating an immersive virtual environment include gyroscopes, accelerometers, magnetometers, cameras, eye-tracking sensors, light detection and ranging (LIDAR) sensors, and others.

The VR input transmitter 270 can be configured to facilitate user input into the VR system 255 for controlling the VR environment. Any suitable VR input devices and/or methods can be implemented. For example, VR controllers (e.g., hand-held controllers), VR treadmills, VR chairs, VR gloves (e.g., haptic gloves), VR suits, and other types of VR input transmitters 270 can be implemented. VR input transmitters 270 can be configured to transmit position data (e.g., locomotion) and command data (e.g., selection of options/actions).

The VR commerce management system 200 can be configured to determine selections of products, placement of products, and/or orientations of products to be displayed by VR system 255 to a user within a VR commerce environment (e.g., a virtual reality shopping space) based on obtained user data (e.g., current contextual data and/or historical data). The VR commerce management system 200 includes a user data receiver 205, a product selection, position, and orientation (SPO) determiner 210, a VR commerce experience analyzer 215, and a VR commerce experience updater 220. In embodiments, the user data receiver 205, product SPO determiner 210, VR commerce experience analyzer 215, and VR commerce experience updater 220 can be processor executable instructions that can be executed by a dedicated or shared processor using received inputs.

A user data receiver 205 of the VR commerce management system 200 can be configured to receive, request, collect, or otherwise obtain user data used for the purpose of determining the selection, position, and orientation of products to be displayed by VR system 255. In embodiments, user data can include historical user data 280 stored in data store 275. The historical user data 280 can include past VR shopping data such as indications of time spent shopping, time viewing particular products (e.g., eye-tracking data), interactions with products (e.g., product reviews, purchases, etc.), queries conducted on products (e.g., searches for products or voice commands used to identify/search for products), mobility within a VR space (e.g., the sections/types of products a user browses, such as particular aisles in a virtual environment a user travels to using locomotion), and/or feedback received from the user regarding their previous VR shopping experiences.

The product SPO determiner 210 can be configured to determine the selection, position, and orientation of products based on the historical user data 280 according to one or more pre-defined rules. For example, a first rule can specify that first time spent viewing a first product (e.g., a first eye-tracking gaze time obtained via eye-tracking within VR in a previous VR shopping experience) can be used to determine that the first product should be selected, displayed in a first location, and/or oriented in a first direction by the product SPO determiner 210. As another example, a second rule can specify that a first interaction with a second product (e.g., a first product review, product purchase, add-to-cart, etc.) can be used to determine that a second product should be selected, displayed in a second location, and/or oriented in a second direction by the product SPO determiner 210. As another example, a third rule can specify that a first observed mobility pattern (e.g., the user frequently browses a particular aisle, such as produce, electronics, dairy, etc.) within a VR shopping environment can be used to determine that a third product (or set of products) should be selected, displayed in a third location, and/or oriented in a third direction by the product SPO determiner 210. Any suitable historical user data 280 can be used for the purpose of determining product selection, position, and/or orientation according to any suitable number and/or type of rules.

In embodiments, current contextual data can be obtained by user data receiver 205 and used to determine product selection, placement, and/or orientation within the virtual environment. Contextual data can be obtained from VR system 255 (e.g., VR sensors 265), IoT devices 225, and/or user device 240. For example, biometric sensors 230 of IoT devices can indicate biometrics associated with a particular user (e.g., a user's heart rate, blood glucose, steps taken, etc.). A/V sensors 235 of the IoT devices 225 and/or A/V sensors 247 of the user device 240 can be used to indicate recognized spoken phrases, gestures, facial expressions (e.g., sentiment), and the like of a user. User data 245 associated with user device 240 can be used to indicate user availability (e.g., calendar data), current browsing activities (e.g., products searched and/or interests), and/or activities the user is involved in (e.g., online gaming).

In embodiments, user availability data can be used to determine the number of products to display within the VR environment as, if the user has little availability (e.g., 10 minutes), they may not have the time to browse a large number of products, whereas if the user has ample availability (e.g., 1 hour), the user may have time to browse a larger number of products. Thus, the number of products to select and integrate within the VR commerce environment can depend on user availability time.

The product SPO determiner 210 can be configured to analyze the current contextual data associated with the user to determine product selection, position, and/or orientation within a virtual commerce experience according to one or more rules. For example, a first rule can specify that a first biometric reading (e.g., heart rate, blood glucose level, steps taken, etc.) of a VR user can be used to determine that the first product should be selected, displayed in a first location, and/or oriented in a first direction by the product SPO determiner 210. As another example, a second rule can specify that a first recognized spoken phrase (e.g., "I would like a new tablet") of a VR user can be used to determine that a second product (e.g., a tablet) should be selected, displayed in a second location, and/or oriented in a second direction by the product SPO determiner 210. As another example, a third rule can specify that a first detected sentiment of a VR user (e.g., based on captured audio/video (A/V) data, such as a user's facial expression) can be used to determine that a third product should be selected, displayed in a third location, and/or oriented in a third direction by the product SPO determiner 210. Any suitable contextual data can be used for the purpose of determining product selection, position, and/or orientation according to one or more rules.

In embodiments, one or more thresholds may be implemented within rules which can dictate whether products should be selected, where products should be positioned, and/or which direction products should be oriented. For example, assume a first threshold within rules defines that if a user interacts with a product (e.g., purchases the product) a first number of times, the product should be selected and positioned in a first position. In this example, if the user interacts with the product at least the first number of times, a determination can be made that the product should be selected and positioned in the first position. Any suitable threshold can be implemented for any suitable historical user data 280 and/or contextual data used to dictate product selection, position, and/or orientation. For example, thresholds can be implemented based on time spent shopping, time viewing products (e.g., eye-gaze time obtained via eye-tracking), queries conducted on products, feedback provided based on product purchases, mobility patterns within a VR space, biometric readings, current availability data, recognized spoken phrases, recognized sentiment (e.g., based on voice and/or facial expressions), browsing activities, and others.

In embodiments, rules can specify that multiple factors can be simultaneously considered when determining the selection, placement, and/or orientation of products displayed within a VR commerce environment. That is, factors such as historical VR shopping data and current contextual data can be simultaneously considered when determining the selection, placement, and orientation of products displayed within a VR commerce environment. In some embodiments, a product selection, placement and/or orientation (SPO) score can be calculated based on a plurality of weighted factors and compared to a threshold to determine whether to select a product, where to place a product, and/or which direction to orient a product within a VR commerce environment. The score can be calculated according to a formula SPO Score=$factor_1 \times weight_1 + factor_2 \times weight_2 \ldots + factor_n \times weight_n$. The SPO score can then be compared to one or more thresholds to determine whether to select a product, where to place a product, and/or which direction to orient a product within a VR commerce environment.

Values for factors (e.g., $factor_1$-$factor_n$) can be assigned/determined in any suitable manner. For example, if eye-tracking gaze time on a first product is taken into consideration as a factor for the selection of the first product within the VR commerce environment, a value of "1" can be assigned if eye-tracking gaze time is determined to exceed an eye-tracking gaze time threshold, and a value of "0" can be assigned if eye-tracking gaze time of the first product falls below the eye-tracking gaze time threshold. Similarly, if a sentiment classification (e.g., happy, excited, sad, frustrated) is taken into consideration as a factor for the selection of the first product, a value of "1" can be assigned if a particular classification match (e.g., excitement) is found, and a value of "0" can be assigned if a classification match is not found. As another example, if heart rate sensor readings are taken into consideration as a factor for the selection of the first product to be displayed in the VR commerce environment, a value of "1" can be assigned at a first BPM range (e.g., 90-100), a value of "0.75" can be assigned at a second BPM range (e.g., 80-90), a value of "0.50" can be assigned at a third BPM range (e.g., 70-80), etc.

Weights (e.g., $weight_1$-$weight_n$) assigned to factors can similarly be assigned/determined in any suitable manner. In embodiments, factors most likely to be important for product selection, placement, and/or orientation can be weighted higher, whereas factors least likely to be important for product selection, placement, and/or orientation can be weighted lower. For example, following the example above, the eye-tracking gaze time factor could have a weight of 0.50, the sentiment classification match factor could have a weight of 0.25, and the heart rate sensor BPM readings could have a weight of 0.25. However, any suitable weights can be assigned to factors.

Following the example above, if eye-tracking gaze time is determined to not exceed the eye-tracking gaze time threshold, a sentiment classification match is found, and a BPM is recorded at 75 BPM, the selection score can be calculated as (0×0.50)+(1×0.25)+(0.5×0.25)=0.375. In this example, if a threshold was defined as 0.50 such that any selection score exceeding 0.50 leads to the selection of the first product, then the first product would not be selected based on the selection score (0.375) not satisfying the selection score threshold (0.50). Though reference is made to example calculations, any suitable values can be substituted for those shown without departing from the spirit and scope of the present disclosure. Further, though an example is given for the selection of a first product, weighted factors can also be considered for the placement and/or orientation of products.

The VR commerce experience analyzer 215 can be configured to analyze the VR commerce experience of the user such that the VR commerce environment can be updated by the VR commerce experience updater 220. For example, based on the user's current experience within the VR commerce environment, such as mobility patterns, eye-tracking patterns, recognized voice, received inputs, interactions with products (e.g., add to cart, remove from cart, purchase, reviews), and the like, the VR commerce experience updater 220 can be configured to dynamically update the VR commerce environment. For example, if a user is determined to have navigated through a particular virtual aisle within the VR commerce environment (e.g., using a locomotion command) by the VR commerce experience analyzer 215, then the VR commerce experience updater 220 can be configured to update the VR commerce environment to remove products that the user already viewed within the virtual aisle and replace them with new products. This can be completed to refresh (e.g., introduce) new products within the VR commerce environment that the VR user may be interested in, remove products that the user may not be interested in, and/or rearrange existing products in instances where the user has not identified or interacted with the products within the VR commerce environment.

In embodiments, machine learning techniques can be used to identify product SPO determination rules that were effective at matching a user's intentions. For example, a machine learning algorithm can ingest many product SPO determinations for a given user and fine-tune the rules for SPO determination (e.g., used by product SPO determiner 210) to better match the user's intentions (e.g., based on their perceived sentiment) in the future.

In embodiments, user feedback can be requested after a product SPO decision is made to gauge whether the user was satisfied or dissatisfied with the determination. This can be used to adjust rules for future SPO determinations (e.g., by providing reward/punishment to a supervised reinforcement machine learning algorithm) used by product SPO determiner 210. For example, if a user is satisfied with a given product selection, then positive feedback can be issued. If a user is dissatisfied with a given product selection, then negative feedback can be issued. Thereafter, one or more thresholds and/or rules for selecting, placing, and/or orienting products can be adjusted based on the received user feedback.

It is noted that FIG. 2 is intended to depict the representative major components of example computing environment. In some embodiments, however, individual components can have greater or lesser complexity than as represented in FIG. 2, components other than or in addition to those shown in FIG. 2 can be present, and the number, type, and configuration of such components can vary.

Figure 3:
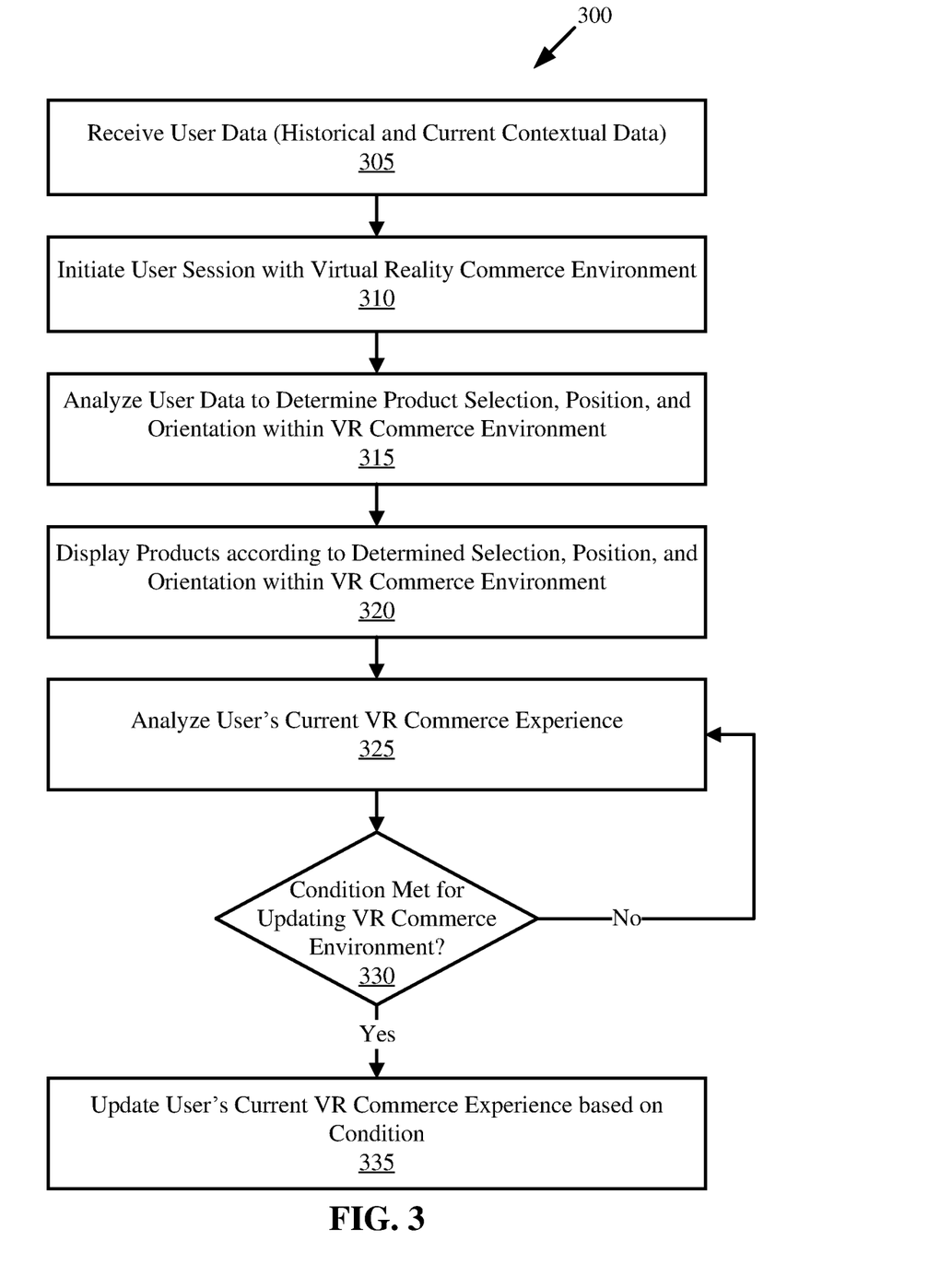
FIG. 3 is a flow-diagram illustrating an example method for virtual reality (VR) based commerce experience enhancement, in accordance with embodiments of the present disclosure.

Referring now to FIG. 3, shown is a flow-diagram illustrating an example method 300 for virtual reality (VR) based commerce experience enhancement, in accordance with embodiments of the present disclosure. One or more operations of method 300 can be completed by one or more computing devices (e.g., devices 105, server 135, IoT devices 225, VR system 255, VR commerce management system 200, user device 240).

Method 300 initiates at operation 305, where user data is received. The user data can be the same, or substantially similar to, user data described with respect to user data receiver 205 of FIG. 2. For example, user data can include historical user data 280 and current contextual data of the user. The user data can be used for the purpose of determining which products to select and integrate into a virtual reality (VR) commerce environment, where to position products within the VR commerce environment, and which direction to orient products within the VR commerce environment.

Method 300 proceeds to operation 310, where a session of a VR commerce environment is initiated with a user. Initiating the VR commerce environment session can be completed in the same, or a substantially similar manner, as described with respect to the VR system 255 of FIG. 2. For example, a VR shopping environment can be displayed on a VR display 260 rendered by a VR renderer 263. Tracking of the user within the virtual environment can be completed using one or more VR sensors 265. Control/locomotion within the VR environment can be completed by one or more VR input transmitters 270.

The user data is then analyzed to determine product selection, position, and orientation (SPO) within the VR commerce environment. This is illustrated at operation 315. Analyzing user data to determine product SPO within the VR commerce environment can be completed in the same, or a substantially similar manner, as described with respect to the product SPO determiner 210 of FIG. 2. For example, one or more rules based on obtained user data (e.g., historical VR shopping data and/or contextual data) dictating product SPO determinations can be referenced. In embodiments, rules based on user data can include one or more thresholds. Further, in embodiments, two or more factors within user data can be weighted and collectively considered to determine selection, position, and orientation of products included in VR commerce environment.

Products are then displayed according to the determined product selection (e.g., the selected set of products to include in the VR commerce environment), position (e.g., location within the VR commerce environment, such as aisle, coordinates, etc.), and orientation (e.g., the direction the product is facing, such as sideways or front-facing). This is illustrated at operation 320. In embodiments, display can be completed by rendering the VR space by a processing device (e.g., a GPU). The rendered VR commerce environment can then be displayed on a VR display (e.g., a VR HMD or smart phone adapted to display VR content).

The user's current VR commerce experience is then analyzed. This is illustrated at operation 325. Analyzing the current VR can include analyzing mobility patterns (e.g., locomotion such as aisles visited, sections visited, etc.), eye-tracking patterns, recognized voice inputs, received inputs (e.g., by a controller), interactions with products (e.g., add to cart, remove from cart, purchase, reviews, save for later), and the like.

A determination is then made whether a condition is met for updating the VR commerce environment. This is illustrated at operation 330. For example, a plurality of conditions can be specified which automatically lead to the addition of new products, removal of existing products, and/or rearranging (e.g., changing position or orientation) of existing products within the VR commerce environment based on the user's current VR commerce experience. Examples of factors that can be used as conditions can include interaction with products (e.g., a product added to a cart may lead to removal of the product from the VR commerce environment), time spent viewing products (e.g., eye-tracking gaze time over a predetermined threshold on a particular product can lead to removal of that product from the VR commerce environment), mobility within the VR commerce environment (e.g., a set of products within a first aisle or section can be removed and replaced with a second set of products if the user fully navigated through the aisle or section), recognized phrases (e.g., a first recognized phrase ("I want product X") can lead to the addition of the product to the VR commerce environment where a second recognized phrase ("I am not interested in product Y") can lead to removal of the product from the VR commerce environment), and others.

If a determination is made that a condition is met for updating the VR commerce environment at operation 330, then the VR commerce environment is updated. This is illustrated at operation 335. For example, if a condition specifies that if a user views a product beyond a threshold time period (e.g., based on eye-tracking data) without adding the product to their cart that the item should be removed from the VR commerce environment, then if the user views the product beyond the threshold time period without adding the product to their cart, the item can be removed from the VR commerce environment. However, any suitable conditions can be implemented based on the user's current VR commerce experience.

If a determination is made that a condition is not met for updating the VR commerce environment at operation 330, then method 300 may return to operation 325 where the user's current VR experience is analyzed. This can be completed continuously during the VR session with the user to dynamically update the VR environment based on the user's current shopping experience.

The aforementioned operations can be completed in any order and are not limited to those described. Additionally, some, all, or none of the aforementioned operations can be completed, while still remaining within the spirit and scope of the present disclosure.

Figure 4:
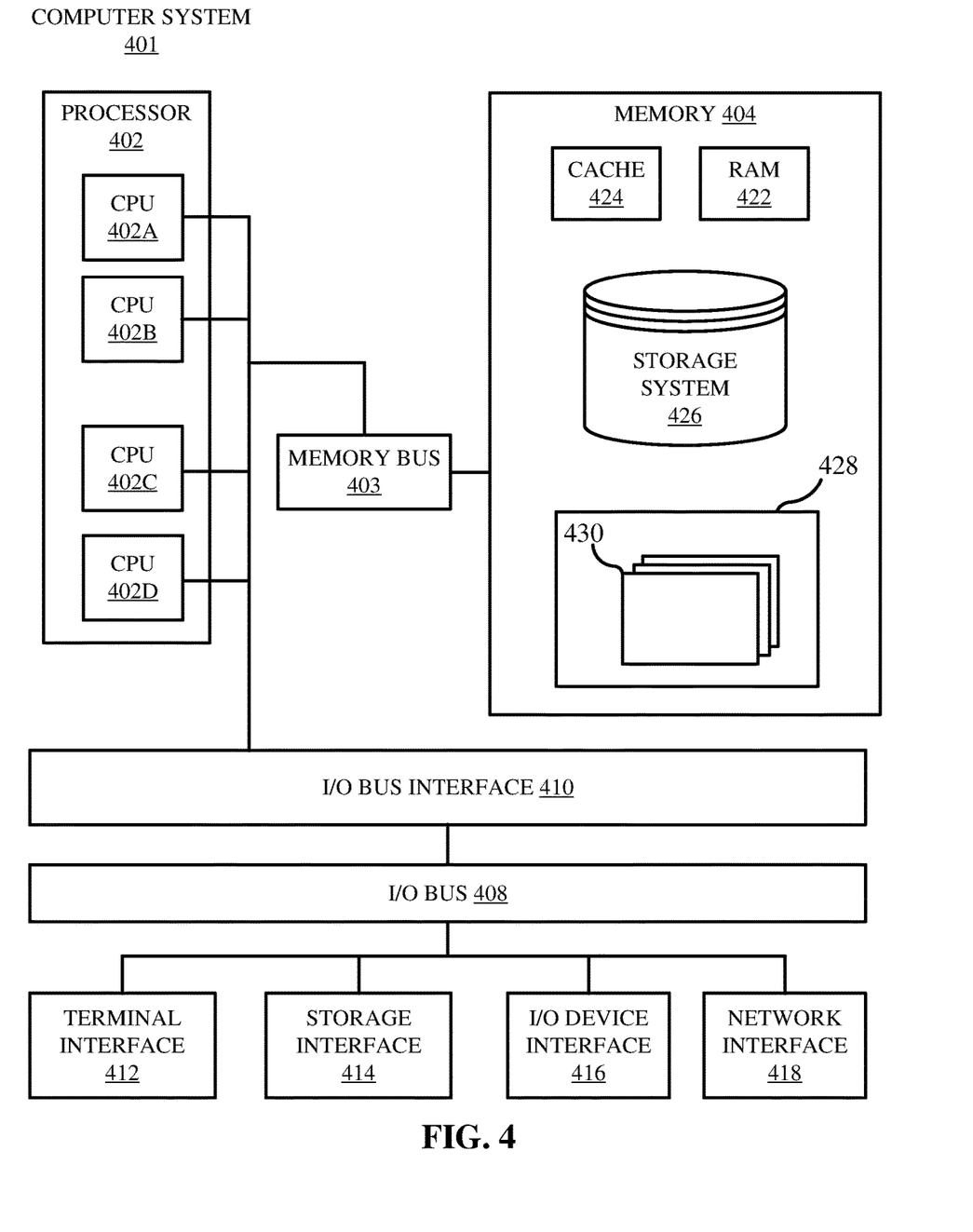
FIG. 4 is a high-level block diagram illustrating an example computer system that can be used in implementing one or more of the methods, tools, modules, and any related functions described herein, in accordance with embodiments of the present disclosure.

Referring now to FIG. 4, shown is a high-level block diagram of an example computer system 401 that may possibly be utilized in various devices discussed herein (e.g., devices 105, server 135, IoT devices 225, VR system 255, VR commerce management system 200, user device 240) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402 (also referred to as processors herein), a memory 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

Memory 404 may include computer system readable media in the form of volatile memory, such as random-access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
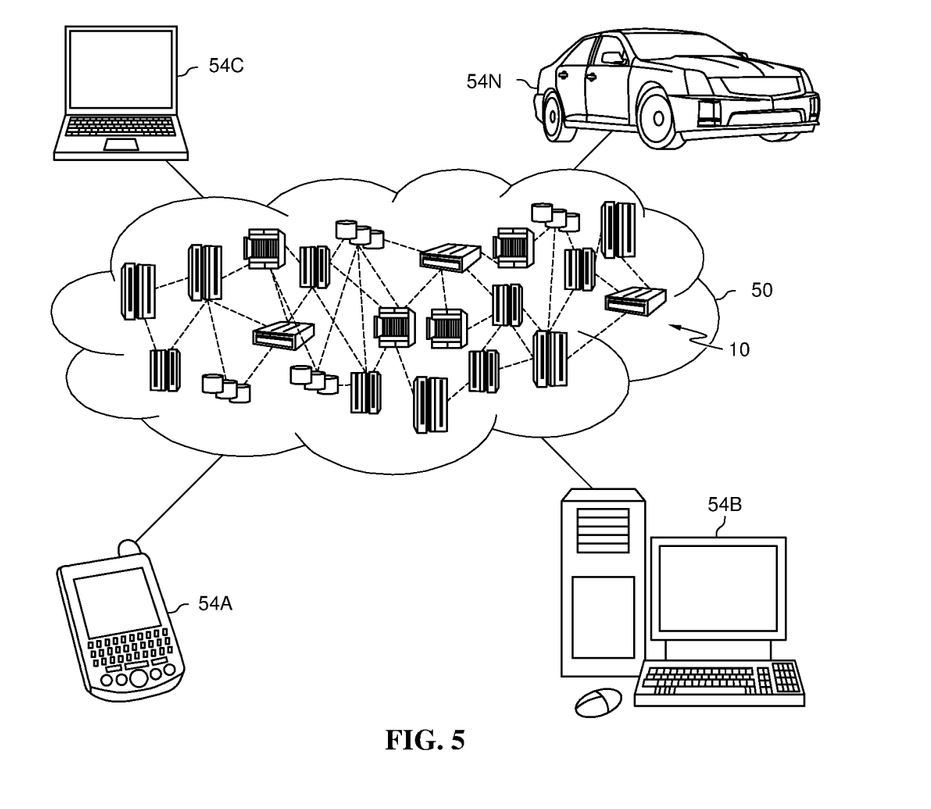
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
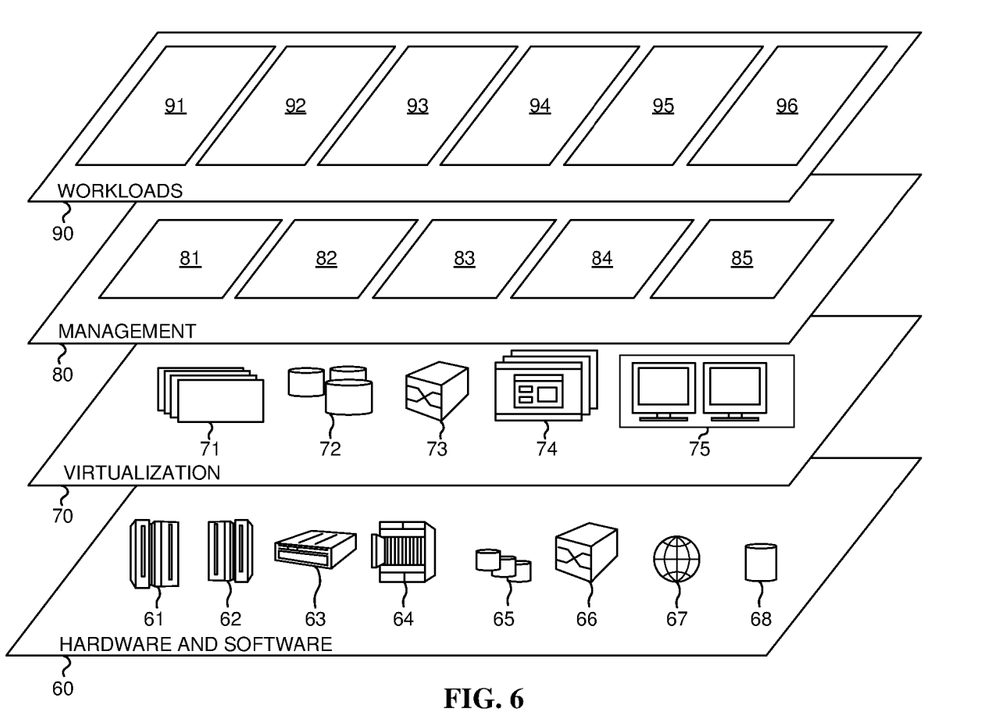
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual reality (VR) commerce management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
receiving a set of user data associated with a user, wherein receiving the set of user data includes:
tracking eye-tracking data indicating eye-tracking gaze times on products by the user in previous virtual reality (VR) commerce sessions with an eye-tracking sensor; and
tracking mobility data of the user in previous VR commerce sessions with a light determining and ranging (LIDAR) sensor and locomotion commands input via a VR controller of a VR system, wherein the mobility data indicates virtual coordinates visited by the user in previous VR commerce sessions using the locomotion commands input via the VR controller and via physical movement within a virtual boundary,
initiating, by the VR system, a session of a VR commerce environment with the user, the VR commerce environment rendered by a processing device and displayed on a VR display;
selecting a set of products to include within the VR commerce environment based on the set of user data, wherein the selecting is based on the eye-tracking gaze times and the virtual coordinates visited by the user in previous VR commerce sessions, wherein a number of the selected set of products is determined based on availability time of the user included in the set of user data;
determining a set of virtual coordinates and an orientation of each of the products of the set of products within the VR commerce environment based on the set of user data, wherein the determined set of virtual coordinates and the determined orientation of each of the products is based on the eye-tracking gaze times and the virtual coordinates visited by the user in previous VR commerce sessions; and
rendering, by the VR system, the set of products within the VR commerce environment according to the determined set of virtual coordinates and the determined orientation of each products of the set of products.

2. The method of claim 1, wherein the set of user data comprises historical VR shopping data and current contextual data of the user.

3. The method of claim 1, wherein the selection of the set of products is determined based on a plurality of weighted factors within the set of user data, wherein a first factor includes an eye-tracking gaze time factor based on the eye-tracking data having a first weight and a second factor includes a mobility factor based on the mobility data having a second weight.

4. The method of claim 1, further comprising:
receiving negative feedback from the user regarding a product of the selected set of products;
inputting the negative feedback into a machine learning algorithm; and
adjusting, by the machine learning algorithm, a rule used to select products to be included in the VR commerce environment based on the received negative feedback.

5. The method of claim 1, further comprising:
analyzing the user's current shopping experience within the displayed VR commerce environment; and
updating the VR commerce environment by adding one or more products to the set of products and removing one or more products from the set of products based on the analyzed user's current shopping experience.

6. A system comprising:
one or more processors; and
one or more computer-readable storage media collectively storing program instructions which, when executed by the one or more processors, are configured to cause the one or more processors to perform a method comprising:
receiving a set of user data associated with a user, wherein receiving the set of user data includes:
tracking eye-tracking data indicating eye-tracking gaze times on products by the user in previous virtual reality (VR) commerce sessions with an eye-tracking sensor; and
tracking mobility data of the user in previous VR commerce sessions with a gyroscope and locomotion commands input via a VR controller of a VR system, wherein the mobility data indicates virtual coordinates visited by the user in previous VR commerce sessions using the locomotion commands input via the VR controller and via physical movement within a virtual boundary,
initiating, by the VR system, a session of a VR commerce environment with the user, the VR commerce environment rendered by a processing device and displayed on a VR display;
selecting a set of products to include within the VR commerce environment based on the set of user data, wherein the selecting is based on the eye-tracking gaze times and the virtual coordinates visited by the user in previous VR commerce sessions, wherein a number of the selected set of products is determined based on availability time of the user included in the set of user data;
determining a set of virtual coordinates and an orientation of each of the products of the set of products within the VR commerce environment based on the set of user data, wherein the determined set of virtual coordinates and the determined orientation of each of the products is based on the eye-tracking gaze times and the virtual coordinates visited by the user in previous VR commerce sessions; and rendering, by the VR system, the set of products within the VR commerce environment according to the determined set of virtual coordinates and the determined orientation of each products of the set of products.

7. The system of claim 6, wherein the set of user data comprises historical VR shopping data and current contextual data of the user.

8. The system of claim 6, wherein the selection of the set of products is determined based on a plurality of weighted factors within the set of user data.

9. The system of claim 6, wherein the one or more computer-readable storage media store additional program instructions which, when executed by the one or more processors, are configured to cause the one or more processors to perform the method further comprising:
receiving negative feedback from the user regarding a product of the selected set of products; and
adjusting a rule used to select products to be included in the VR commerce environment based on the received negative feedback.

10. The system of claim 6, wherein the one or more computer-readable storage media store additional program instructions which, when executed by the one or more processors, are configured to cause the one or more processors to perform the method further comprising:
analyzing the user's current shopping experience within the displayed VR commerce environment; and
updating the VR commerce environment by adding one or more products to the set of products and removing one or more products from the set of products based on the analyzed user's current shopping experience.

11. A computer program product comprising one or more computer readable storage media, and program instructions collectively stored on the one or more computer readable storage media, the program instructions comprising instructions configured to cause one or more processors to perform a method comprising:
receiving a set of user data associated with a user, wherein receiving the set of user data includes:
tracking eye-tracking data indicating eye-tracking gaze times on products by the user in previous virtual reality (VR) commerce sessions as collected by an eye-tracking sensor; and
tracking mobility data of the user in previous VR commerce sessions with an accelerometer and locomotion commands input via a VR controller of a VR system, wherein the mobility data indicates virtual coordinates visited by the user in previous VR commerce sessions using the locomotion commands input via the VR controller and via physical movement within a virtual boundary, initiating, by the VR system, a session of a VR commerce environment with the user, the VR commerce environment rendered by a processing device and displayed on a VR display;
selecting a set of products to include within the VR commerce environment based on the set of user data, wherein the selecting is based on the eye-tracking gaze times and the virtual coordinates visited by the user in previous VR commerce sessions, wherein a number of the selected set of products is determined based on availability time of the user included in the set of user data;
determining a set of virtual coordinates and an orientation of each of the products of the set of products within the VR commerce environment based on the set of user data, wherein the determined set of virtual coordinates and the determined orientation of each of the products is based on the eye-tracking gaze times and the virtual coordinates visited by the user in previous VR commerce sessions; and
rendering, by the VR system the set of products within the VR commerce environment according to the determined set of virtual coordinates and the determined orientation of each products of the set of products.

12. The computer program product of claim 11, wherein the set of user data comprises historical VR shopping data and current contextual data of the user.

13. The computer program product of claim 11, wherein the selection of the set of products is determined based on a plurality of weighted factors within the set of user data.

14. The computer program product of claim 11, wherein the one or more computer readable storage media store additional program instructions configured to cause the one or more processors to perform the method further comprising:
receiving negative feedback from the user regarding a product of the selected set of products; and
adjusting a rule used to select products to be included in the VR commerce environment based on the received negative feedback.

15. The computer program product of claim 11, wherein the one or more computer readable storage media store additional program instructions configured to cause the one or more processors to perform the method further comprising:
analyzing the user's current shopping experience within the displayed VR commerce environment; and
updating the VR commerce environment by adding one or more products to the set of products and removing one or more products from the set of products based on the analyzed user's current shopping experience.

16. The computer program product of claim 11, wherein the set of virtual coordinates of each of the products of the set of products is determined based on a plurality of weighted factors within the set of user data.

17. The computer program product of claim 11, wherein the orientation of each of the products of the set of products is determined based on a plurality of weighted factors within the set of user data.

* * * * *